US011001306B2

(12) United States Patent
Kulkarni et al.

(10) Patent No.: US 11,001,306 B2
(45) Date of Patent: May 11, 2021

(54) ISOLATION MOUNT ASSEMBLY

(71) Applicants:Honda Motor Co., Ltd., Tokyo (JP); YUSA Corporation, Washington Court House, OH (US)

(72) Inventors: Swapnil Kulkarni, Dublin, OH (US); Steven Spencer, Marysville, OH (US); Derek John Horton, Powell, OH (US); Tsutomu Tamura, Tochigi (JP); Brian S. Welch, Grove City, OH (US); Max B. Cruz Raygada, Dublin, OH (US)

(73) Assignees: HONDA MOTOR CO., LTD., Tokyo (JP); YUSA CORPORATION, Washington Court House, OH (US)

( * ) Notice: Subject to any disclaimer, the term of this patent is extended or adjusted under 35 U.S.C. 154(b) by 183 days.

(21) Appl. No.: 16/051,785

(22) Filed: Aug. 1, 2018

(65) Prior Publication Data

US 2019/0039656 A1 Feb. 7, 2019

Related U.S. Application Data

(60) Provisional application No. 62/539,623, filed on Aug. 1, 2017.

(51) Int. Cl.
*B62D 24/02* (2006.01)
*F16F 15/08* (2006.01)
*F16F 1/373* (2006.01)
*F16F 1/38* (2006.01)
*B62D 21/11* (2006.01)

(52) U.S. Cl.
CPC ............ *B62D 24/02* (2013.01); *F16F 1/3732* (2013.01); *F16F 1/3842* (2013.01); *F16F 15/08* (2013.01); *B62D 21/11* (2013.01)

(58) Field of Classification Search
CPC ........ F16F 15/08; F16F 1/3732; F16F 1/3482; F16F 1/3842; B62D 24/02; B62D 21/11
USPC ....... 267/140.11, 141.4, 141.2; 248/636, 638
See application file for complete search history.

(56) References Cited

U.S. PATENT DOCUMENTS

| 3,721,417 | A | * | 3/1973 | Skala | ........................ | F16F 3/12 |
| | | | | | | 267/140.11 |
| 5,722,631 | A | * | 3/1998 | Dorton | .................. | F16B 5/0258 |
| | | | | | | 248/635 |
| 6,120,011 | A | * | 9/2000 | Maeno | ................. | B60K 5/1291 |
| | | | | | | 267/140 |

(Continued)

*Primary Examiner* — Pamela Rodriguez
(74) *Attorney, Agent, or Firm* — Mark E. Duell; Rankin, Hill & Clark LLP (57) ABSTRACT

An isolation mount assembly includes a rubber isolator formed to be seated within an aperture in a supported member, with an extension located on an exterior surface of the isolator; and includes a washer containing an aperture corresponding with a location of the extension. The isolator may include a through-hole and an inner sleeve, and be seated within a supported member. A method for temporarily securing a washer to a rubber isolator includes aligning an aperture in the washer to a corresponding securing feature on the isolator, inserting the securing feature through the aperture, pulling a detached end of the securing feature, pushing the washer towards the isolator until it makes contact with the surface of the isolator, and releasing the detached end of the securing feature. An exemplary method may include trimming or deforming an excess part of the extension after releasing the detached end.

19 Claims, 9 Drawing Sheets

(56) References Cited

U.S. PATENT DOCUMENTS

| | | | |
|---|---|---|---|
| 6,439,557 B1* | 8/2002 | Stitt | F16F 7/00 248/634 |
| 8,474,804 B2* | 7/2013 | Masterson | F16F 1/3732 267/141 |
| 9,038,997 B2* | 5/2015 | Bradshaw | F16F 13/16 267/292 |
| 2008/0150203 A1* | 6/2008 | Mir | B60K 5/1208 267/140.11 |
| 2012/0061890 A1* | 3/2012 | Goudie | F16F 13/16 267/140.11 |

* cited by examiner

ISOLATION MOUNT ASSEMBLY

This application claims the benefit of U.S. provisional patent application Ser. No. 62/539,623, filed Aug. 1, 2017, which is incorporated by reference in its entirety herein.

BACKGROUND

In automotive manufacturing, many major subframe components are pre-assembled prior to attachment to a vehicle to reduce production time on a final assembly line and increase efficiency. These pre-assembled subframe components can present manufacturing issues if obstructions are present within a subframe assembly that interfere with hardware installation and accessibility for tooling during a final vehicle assembly process.

Vehicle subframes are often attached to a vehicle body through isolation mounts to attenuate noise and vibration. These isolation mounts can include bolts and washers as hardware components for attachment, of which each hardware component is a stand-alone part. The washer can be temporarily captured and retained to the isolation mount during pre-assembly of the subframe to address manufacturing issues that may be presented if there is inadequate clearance to efficiently attach the washer to the isolation mount during a final assembly process.

SUMMARY

According to one aspect, an isolation mount assembly includes a rubber isolator formed to be seated within an aperture in a supported member, and includes a tapered extension located on an exterior surface of the rubber isolator. The isolation mount assembly also includes a washer containing an aperture located in a position corresponding with the tapered extension on the rubber isolator.

According to one embodiment of the preceding aspect, the rubber isolator with a tapered extension includes a through-hole and is positioned between an upper support structure and a lower support structure. According to another embodiment, a maximum cross-sectional area of the tapered extension is greater than a cross-sectional area of the aperture in the washer. According to an additional embodiment, the tapered extension includes a marking to indicate a shortened trim length.

According to another aspect, an isolation mount assembly includes a rubber isolator formed to be seated within an aperture in a supported member, and includes an extension located on an exterior surface of the rubber isolator, wherein the extension includes a tapered part, and a retention disc part formed around an axis of the tapered part. The isolation mount assembly also includes a washer containing apertures located in positions corresponding with the straight extensions on the rubber isolator.

According to one embodiment of the preceding aspect, the rubber isolator with an extension including the retention disc includes a through-hole and is positioned between an upper support structure and a lower support structure. According to another embodiment, a cross-sectional area of the aperture in the washer is less than a maximum cross-sectional area of the tapered part of the extension; a maximum cross-sectional area of the retention disc part of the extension is greater than the maximum cross-sectional area of the tapered part of the extension, and greater than the cross-sectional area of the aperture. According to an additional embodiment, the extension includes a marking to indicate a shortened trim length.

According to another aspect, a method for temporarily securing a washer to a rubber isolator includes aligning an aperture in a washer to a corresponding securing feature on a rubber isolator, inserting the securing feature through the aperture, pulling a detached end of the securing feature until a cross-sectional area at its largest section is reduced, pushing the washer towards the rubber isolator until it makes contact with a surface of the rubber isolator, and releasing the detached end of the securing feature.

DETAILED DESCRIPTION

With reference now to the figures wherein the illustrations are for purposes of illustrating one or more exemplary embodiments and not for purposes of limiting the same, there is shown an isolation mount assembly 100 for a vehicle.

Referring to FIGS. 1-6, the isolation mount assembly 100 includes a rubber isolator 102 and a washer 104. The rubber isolator 102 is formed to be seated within an aperture in a supported member 502 and adjacent a support structure 406. In an alternative embodiment, a rubber isolator 606 may be seated within an aperture in a supported member 604 and between an upper support structure 602 and a lower support structure 608. It is understood that the form of each component within the isolation mount assembly 100 may be modified from that shown in the depicted embodiments to allow for use of the isolation mount assembly 100 in a variety of applications.

Figure 1:
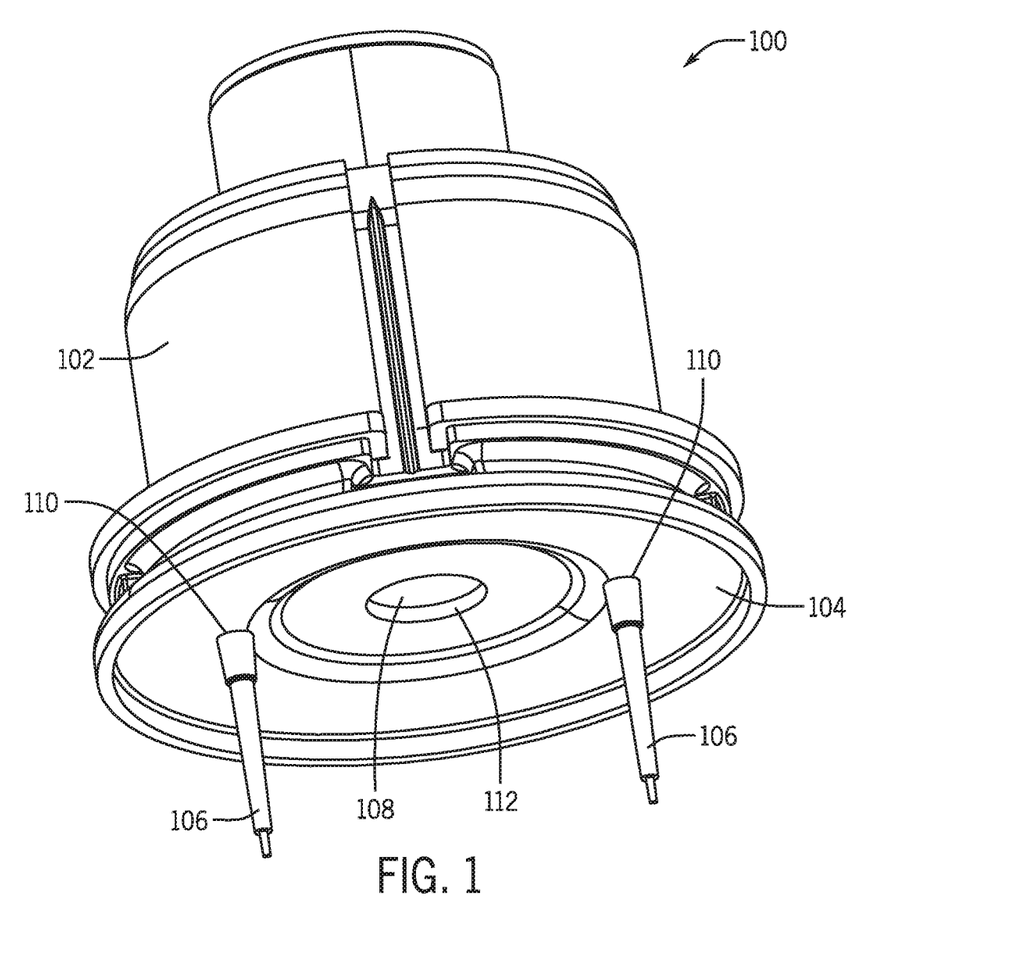
FIG. 1 is a perspective view of an isolation mount assembly according to an exemplary embodiment.

As shown in FIG. 1, the rubber isolator 102 includes two tapered extensions 106 located on one exterior surface of the rubber isolator 102. In alternative embodiments, the rubber isolator 102 may include three or more extensions located on one or more of its exterior surfaces.

The washer 104 includes apertures 110 alignable with the tapered extensions 106 on the rubber isolator 102. In the depicted embodiment, the washer 104 includes a center aperture 112 alignable with an axial through-hole 108 extending between opposite surfaces of the rubber isolator 102. In yet another embodiment, the rubber isolator 102 may include an inner sleeve 107 (see FIG. 2) located within the through-hole 108 and extending axially through the through-hole from one exterior surface to another. The inner sleeve 107 may be constructed out of metal or plastic as best suited for the specific application.

Figure 2:
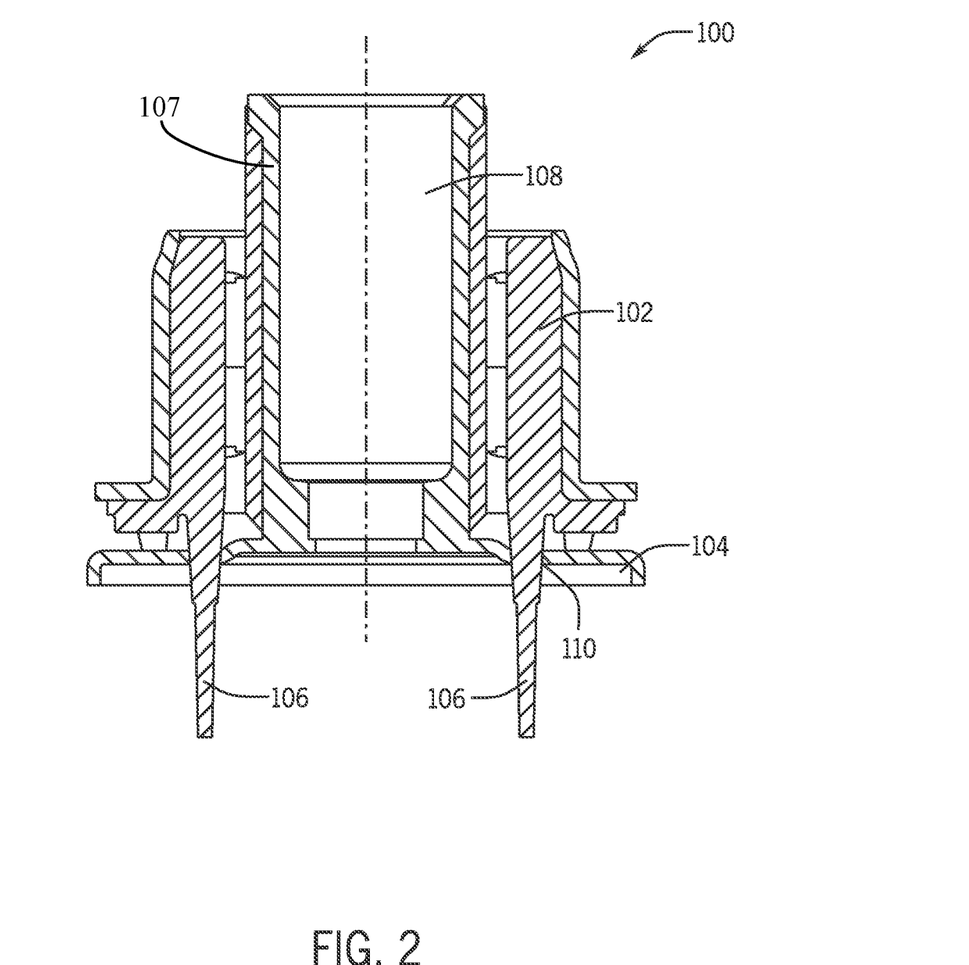
FIG. 2 is a sectional view of the isolation mount assembly in FIG. 1.

FIG. 2 shows a sectional view of the isolation mount assembly 100 of FIG. 1. As depicted in FIG. 2, the tapered extensions 106 are formed integrally with the rubber isolator 102. The washer 104 is positioned adjacent to the rubber isolator 102.

Figure 3:
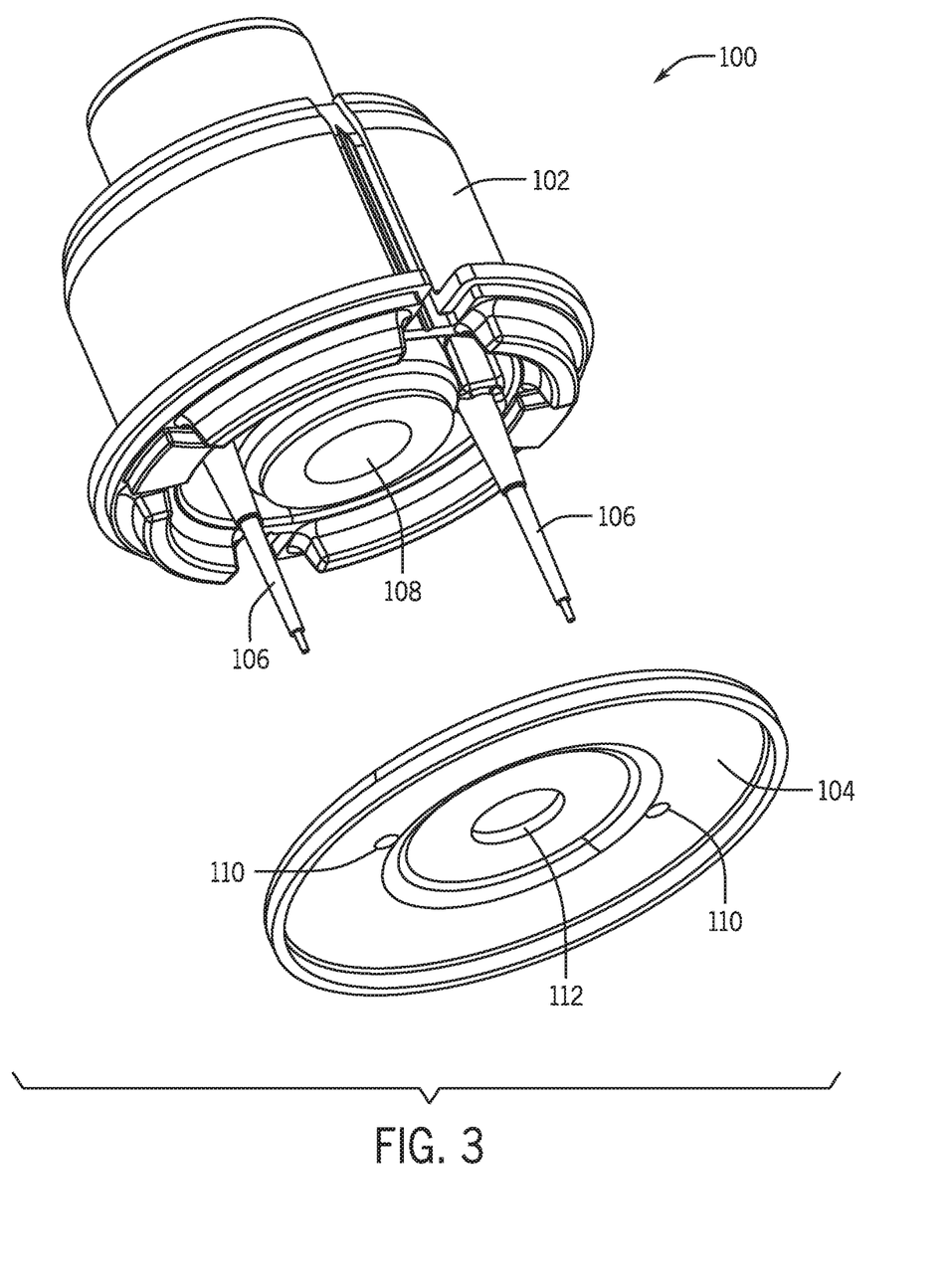
FIG. 3 is an exploded perspective view of a rubber isolator and a washer of the isolation mount assembly in FIG. 1.

FIG. 3 shows an exploded perspective view of the rubber isolator 102 and washer 104 of the isolation mount assembly 100 provided in FIG. 1. The washer 104 contains an aperture 110 corresponding with a position of each tapered extension 106 on the rubber isolator 102, as well as a center aperture 112. Additionally, FIG. 3 shows the axial through-hole 108 extending from one exterior surface of the rubber isolator 102 to another, and also shows the center aperture 112 of the washer 104 aligning with the through-hole 108 of the rubber isolator 102.

Figure 4:
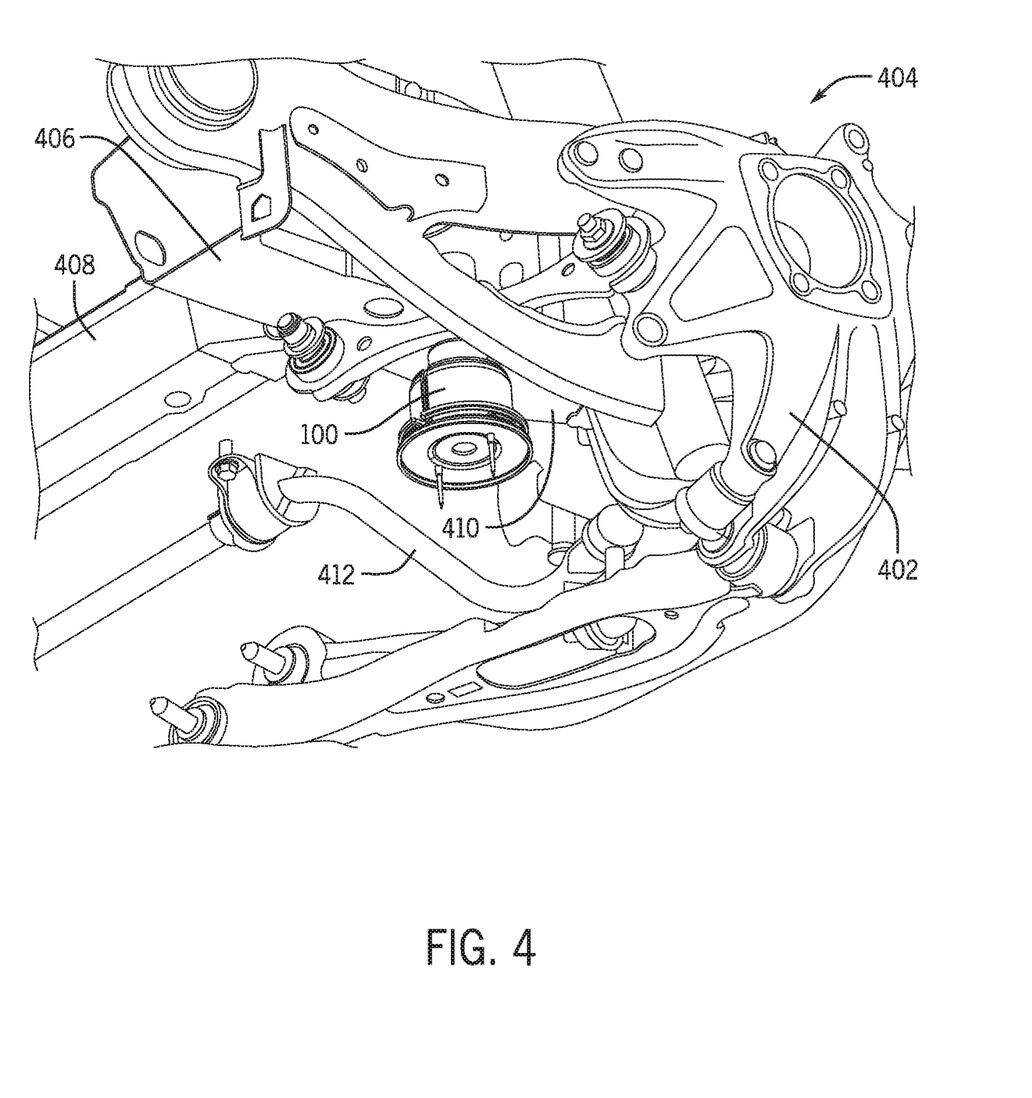
FIG. 4 is a perspective view of the isolation mount assembly in FIG. 1 positioned in an exemplary environment.

FIG. 4 shows a perspective view of the isolation mount assembly 100 provided in FIG. 1 positioned in an exemplary environment. The isolation mount assembly 100 is depicted within a rear suspension system 404 showing its position relative to various other suspension components, including a knuckle 402, frame rail 406, cross member 408, and stabilizer bar 412. In an installed state, the isolation mount assembly 100 would be seated within an aperture in the supported member 502 and connected to the support structure 410 using a bolt 510.

Figure 5:
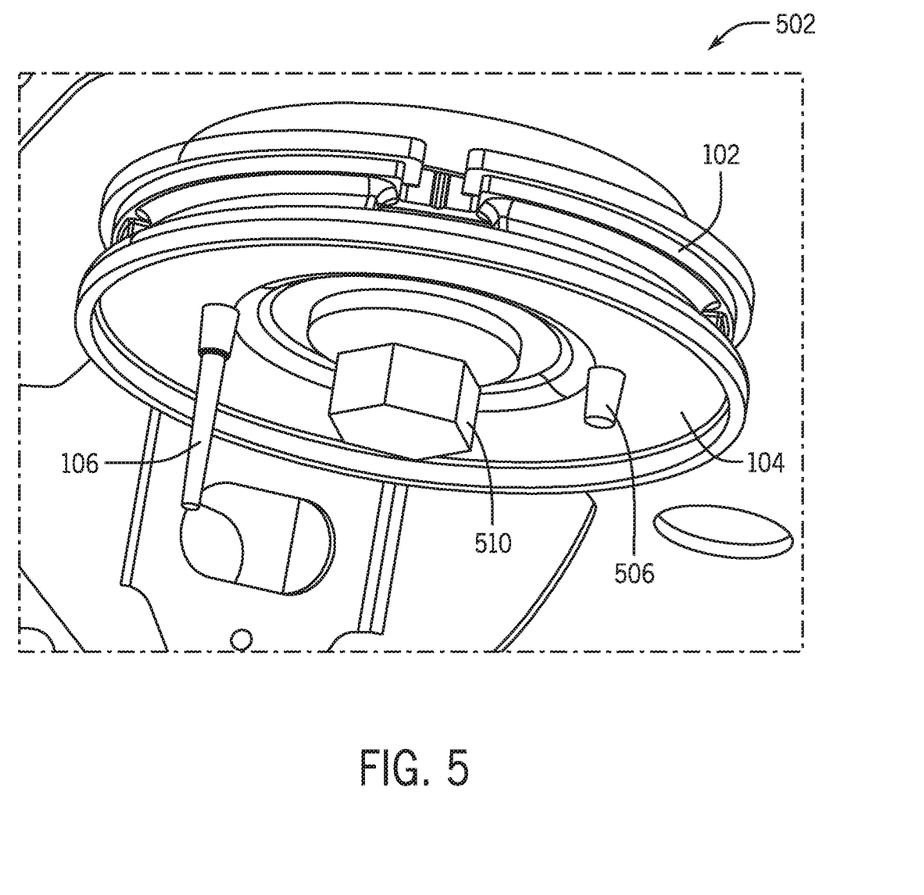
FIG. 5 is a perspective view of the isolation mount assembly provided in FIG. 1 mounted in an exemplary position.

FIG. 5 shows a perspective view of the isolation mount assembly 100 provided in FIG. 1. In this installed state, as previously described, the isolation mount assembly 100 is seated within an aperture in the supported member 502 and is connected to a support structure 410 using the bolt 510. In the embodiment depicted in FIGS. 1-5, the supported member 502 is a vehicle subframe and the support structure 410 is a vehicle frame rail. The isolation mount assembly 100 contacts a surface of the vehicle subframe and a surface of the vehicle frame rail, but the vehicle subframe does not directly contact the vehicle frame rail. Coupling the vehicle subframe to the vehicle frame rail through the isolation mount assembly 100 allows for a floating mounting configuration, wherein the vehicle subframe is allowed a minimal amount of movement relative to the vehicle frame rail. The rubber isolator 102 of the isolation mount assembly 100 is constructed of a rubber material that isolates the subframe from the vehicle frame rail to reduce transmission of vibration and sound between a vehicle's suspension and its frame. In an exemplary configuration, the vehicle subframe is connected to the vehicle frame exclusively through multiple isolation mount assemblies.

As shown in FIG. 5, one tapered extension is trimmed at a marked, shortened trim length 702 to illustrate a trimmed extension 506 in a final installed form according to one embodiment. An untrimmed tapered extension 106 is provided to illustrate a difference in length between a trimmed extension 506 and an untrimmed tapered extension 106.

Figure 6:
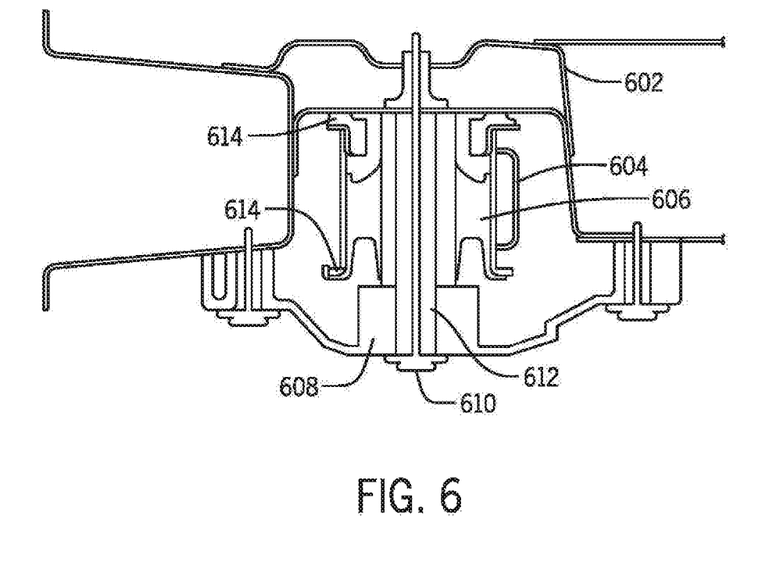
FIG. 6 is a sectional view of an isolation mount assembly positioned within an aperture in a supported member and between an upper support structure and a lower support structure.

FIG. 6 shows a sectional view of an isolation mount assembly installed within an aperture in a supported member 604 according to an alternative embodiment. As depicted in this embodiment, the isolation mount assembly is located within an aperture in a supported member 604, and between an upper support structure 602 and a lower support structure 608, allowing the supported member 604 to be coupled between the upper support structure 602 and lower support structure 608. The rubber isolator 606 is formed with a flange 614 to extend beyond exterior surfaces of the aperture to prevent the supported member 604 from contacting either the upper support structure 602 or the lower support structure 608.

Figure 7:
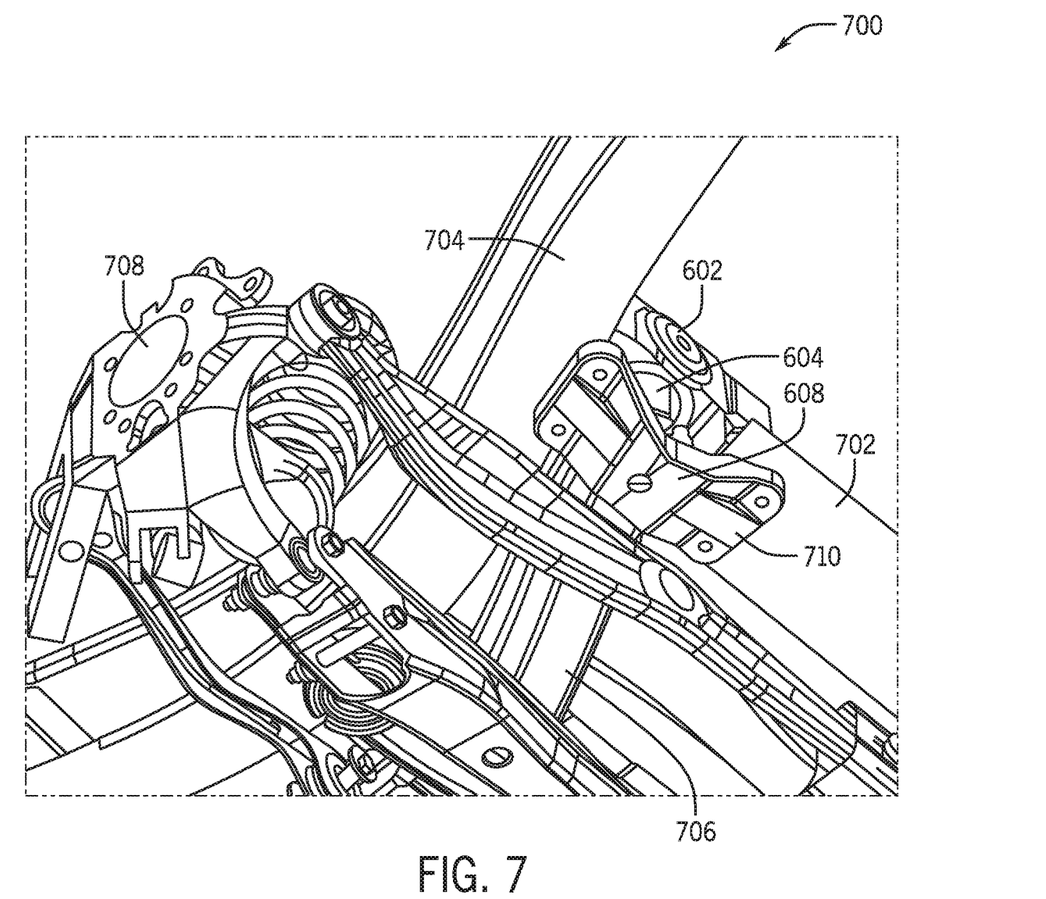
FIG. 7 is a perspective view of the isolation mount assembly provided in FIG. 6 mounted in an exemplary position.

FIG. 7 shows a perspective view of the isolation mount assembly provided in FIG. 6 positioned in an exemplary environment. The isolation mount assembly is depicted within an aperture in a subframe 706 of a rear suspension system 700 of a vehicle showing its position relative to various other suspension components, including a knuckle 708, frame rail 704, and cross member 702.

As depicted in FIGS. 6 and 7, the supported member 604 is a rear vehicle subframe, the upper support structure 602 is a cross member, and the lower support structure 608 is a stay bracket. The isolation mount assembly is positioned within an aperture in the subframe and contacts the vehicle frame rail on one surface, and the stay bracket on an opposite surface. The isolation mount assembly is used to connect the rear vehicle subframe to the vehicle frame rail and stay bracket in a floating configuration wherein the rear vehicle subframe is allowed a minimal amount of movement relative to the vehicle frame rail and stay bracket. The stay bracket provides additional structural support compared to embodiments that do not include a stay bracket, such as the embodiment provided in FIGS. 1-5. In an exemplary configuration, a rear vehicle subframe is connected to a vehicle frame rail exclusively through multiple isolation mount assemblies and stay brackets.

Figure 8:
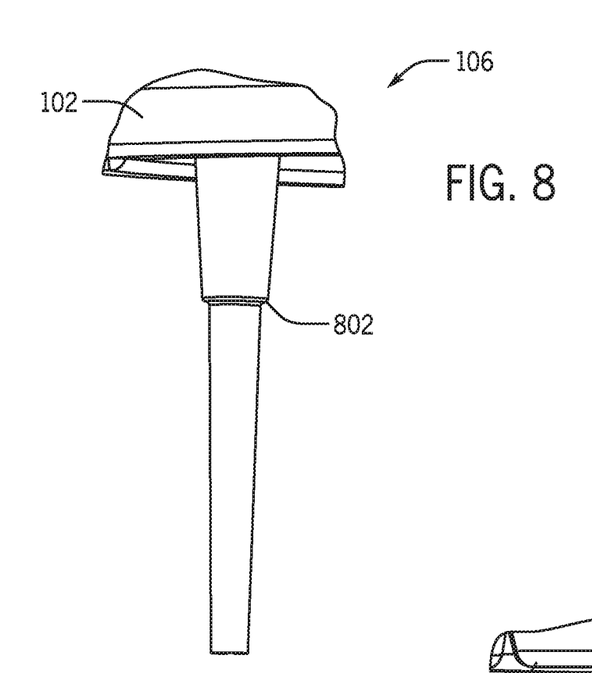
FIG. 8 is a perspective view of a tapered extension according to an exemplary embodiment.

FIG. 8 shows a perspective view of a tapered extension 106 according to an exemplary embodiment. A maximum cross-sectional area of each tapered extension 106 is greater than a cross-sectional area of each corresponding aperture 110 in the washer 104. It will be appreciated that dimensions of the tapered extension 106 can vary to allow for efficient alignment and seating of the washer 104, while ensuring temporary retention until the isolation mount assembly 100 is installed within an aperture in the supported member 502 and to the support structure 410.

Figure 9:
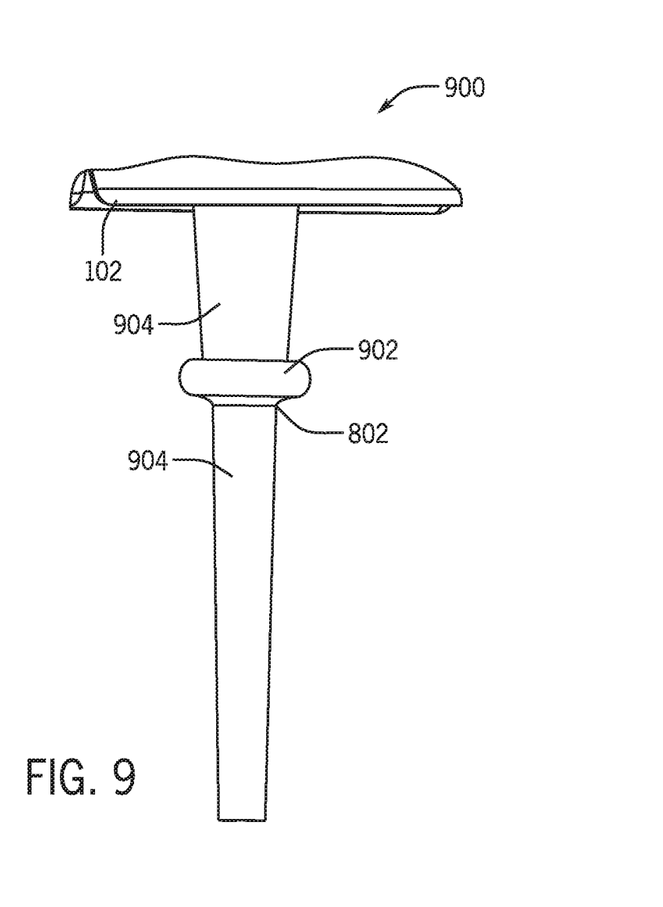
FIG. 9 is a perspective view of an extension with a tapered part and a retention disc part according to an exemplary embodiment.

FIG. 9 shows a perspective view of an extension including a tapered part 904 and an obstruction in the form of a retention disc part 902 according to an exemplary embodiment. Alternative embodiments may present the obstruction in a variety of forms, including a wedge, barb, and dome-shaped feature depending on the application, to facilitate installation of the washer 104 onto the rubber isolator 102 and improve its washer-retention capability.

Referring to FIG. 8 and FIG. 9, the extension is formed as an integrated part of the rubber isolator. The material is a rubber compound that allows the extension 106, 900 to stretch in an axial direction with a minimal amount of tension force able to be exerted manually by a human operator. The material will deform in a manner that reduces the cross-sectional area of the extension 106, 900 as it is pulled in an axial direction. When released from a stretched state, the material's elastic properties will allow the extension 106, 900 to return to its original form. The extension 106, 900 in its original form will create an interference fit between itself and the aperture 110 in the washer, thus retaining the washer in a position that it is placed onto the extension 106, 900 at the time the extension 106, 900 is released from the stretched state. The extension 106, 900 may include a marking to indicate a shortened trim length 802 at which the extension 106, 900 may be trimmed after installation to eliminate excess material if no longer needed to manipulate to the extension 106, 900. In an alternative embodiment, the extension 106, 900 may be deformed rather than trimmed at the shortened trim length 802 if excess material is no longer needed.

Figure 10:
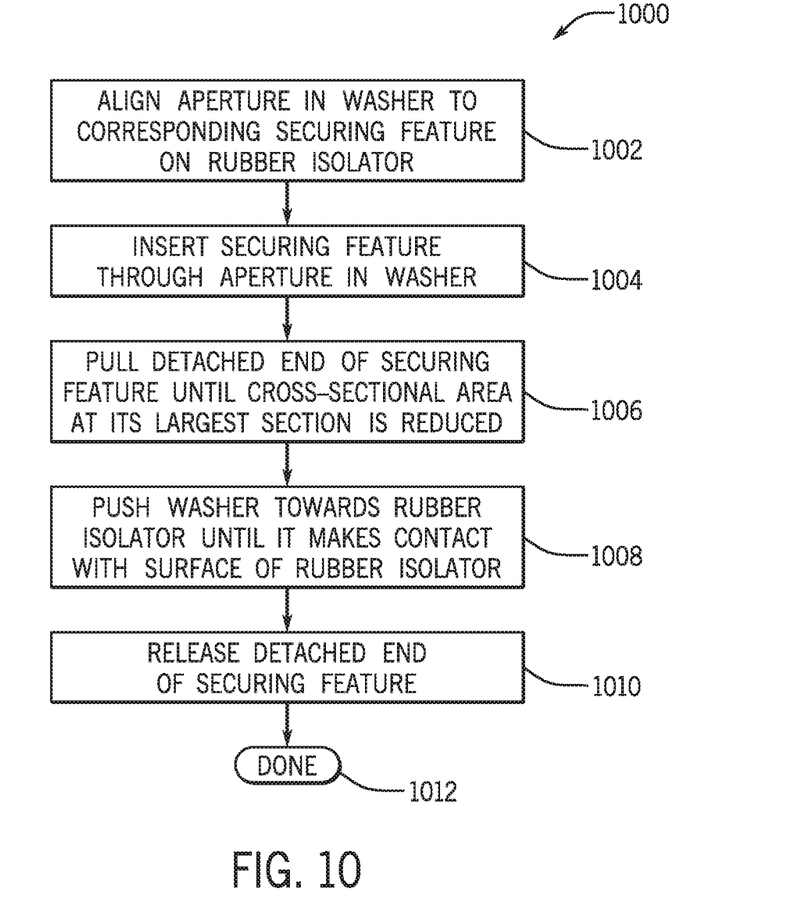
FIG. 10 is a method of retaining a washer onto a rubber isolator according to an exemplary embodiment.

FIG. 10 shows a method of retaining a washer onto a rubber isolator. In block 1002, method 1000 aligns an aperture in the washer to a corresponding securing feature on the rubber isolator. In block 1004, method 1000 inserts the securing feature through the aperture in the washer. In block 1006, method 1000 pulls a detached end of the securing feature until a cross-sectional area at its largest section is reduced. In block 1008, method 1000 pushes the washer towards the rubber isolator until it makes contact with a surface of the rubber isolator. In block 1010, method 1000 releases the detached end of the securing feature. In done block 1012, method 1000 ends.

The foregoing detailed description of exemplary embodiments is included for illustrative purposes only. It should be understood that other embodiments could be used, or modifications and additions could be made to the described embodiments. Therefore, the disclosure is not limited to the embodiments shown, but rather should be construed in breadth and scope in accordance with the recitations of the appended claims.

What is claimed is:

1. An isolation mount assembly, comprising:
   a rubber isolator formed to be seated within an aperture in a supported member, the rubber isolator having a through-hole extending therethrough and a tapered extension located on an exterior surface of the rubber isolator at a location spaced apart from the through-hole; and
   a washer having a through-hole aperture located in a first position corresponding with the through-hole of the rubber isolator and a tapered extension aperture located in a position corresponding with the tapered extension on the rubber isolator.

2. The isolation mount assembly of claim 1, wherein the rubber isolator is positioned between an upper support structure and a lower support structure for coupling the upper support structure and the lower support structure in spaced relation relative to one another to thereby reduce transmission of vibration and sound therebetween, and wherein the tapered extension is received through the through-hole aperture of the washer.

3. The isolation mount assembly of claim 2, wherein the through-hole extends between opposite surfaces of the isolator and located between the upper support structure and the lower support structure.

4. The isolation mount assembly of claim 3, wherein the rubber isolator includes an inner sleeve located within the through-hole and extending axially through the through-hole between the upper support structure and the lower support structure.

5. The isolation mount assembly of claim 1, wherein a cross-sectional area of the tapered extension aperture in the washer is less than a maximum cross-sectional area of the tapered extension.

6. The isolation mount assembly of claim 1, wherein the tapered extension includes a marking to indicate a shortened trim length.

7. The isolation mount assembly of claim 1, wherein the tapered extension includes an obstruction to facilitate installation of the washer onto the rubber isolator.

8. The isolation mount assembly of claim 7, wherein the obstruction is in the form of a retention disc part formed around an axis of the tapered extension.

9. The isolation mount assembly of claim 1, wherein the through-hole has a through-hole axis and is adapted to receive a threaded fastener therethrough, and wherein the tapered extension is parallel to and radially offset relative to the through-hole axis, and further wherein the tapered extension extends in a direction relative to the exterior surface that is opposite a direction into which the through-hole extends into the rubber isolator.

10. The isolation mount assembly of claim 1, wherein the tapered extension includes a retention disc part disposed axially therealong in axially spaced relation to the exterior surface and to a distal end of the tapered extension.

11. The isolation mount assembly of claim 1, wherein the tapered extension includes a distal end, and wherein a tapered surface of the tapered extension tapers continuously from the distal end to the exterior surface of the rubber isolator.

12. The isolation mount assembly of claim 1, wherein the tapered extension is a first tapered extension and the tapered extension aperture is a first tapered extension aperture, and wherein the rubber isolator has a second tapered extension also located on the exterior surface of the rubber isolator at a location spaced apart from the through-hole and the washer has a second tapered extension aperture located at a position corresponding with the second tapered extension on the rubber isolator, the first and second tapered extensions located on the exterior surface of the rubber isolator at diametrically opposed locations relative to the through-hole.

13. An isolation mount assembly, comprising:
    a rubber isolator formed to be seated within an aperture in a supported member, and including an extension located on an exterior surface of the isolator, wherein the extension includes a tapered part and a retention disc part formed around an axis of the tapered part; and
    a washer including an aperture located in a position corresponding with the extension on the rubber isolator,
    wherein the rubber isolator is positioned between an upper support structure and a lower support structure, and wherein the rubber isolator has a through-hole extending therethrough for receipt of a threaded fastener for securing the upper support structure and the lower support structure together, and wherein the extension is radially offset relative to the through-hole and spaced apart from the through-hole.

14. The isolation mount assembly of claim 13, wherein a cross-sectional area of the aperture in the washer is less than a maximum cross-sectional area of the tapered part of the extension, and wherein the disc part has an axial thickness that is approximately the same as that of the washer.

15. The isolation mount assembly of claim 13, wherein a maximum cross-sectional area of the retention disc part of the extension is greater than a maximum cross-sectional area of the tapered part of the extension, and greater than a cross-sectional area of the aperture in the washer.

16. The isolation mount assembly of claim 13, wherein the extension includes a marking to indicate a shortened trim length.

17. An isolation mount assembly for securing an upper support structure and a lower support structure together in spaced relation relative to one another to thereby reduce transmission of vibration and sound therebetween, the isolation mount assembly including:
    an isolator formed of a resilient material and having a through-hole extending therethrough, the isolator having a pair of tapered extensions located on an exterior surface of the isolator into which the through-hole is formed, the pair of tapered extensions are circumferentially disposed about the through-hole at locations radially spaced apart from the through-hole, and a washer having a through-hole aperture positioned in registry with the through-hole of the isolator, and further having a pair of tapered extension apertures respectively positioned in registry with the pair of tapered extensions.

18. The isolation mount assembly of claim 17, wherein each of the pair of tapered extensions is sized to create an interference fit between the isolator and the washer such that the washer is at least initially holdable in a spaced apart position relative to the exterior surface when the pair of tapered extensions are received through the pair of tapered extension apertures of the washer.

19. The isolation mount assembly of claim 18 wherein the pair of tapered extensions each include a disc part disposed between respective proximal and distal ends of the pair of tapered extensions.

\* \* \* \* \*